United States Patent

[11] 3,596,516

| [72] | Inventors | Stewart Haynes, Jr.;<br>Fuad T. Saadeh, both of Houston, Tex. |
|------|-----------|----------------------------------------------------------------|
| [21] | Appl. No. | 839,102 |
| [22] | Filed | Mar. 27, 1969<br>Division of Ser. No. 686,931, Nov. 30, 1967 |
| [45] | Patented | Aug. 3, 1971 |
| [73] | Assignee | Texaco Inc.<br>New York, N.Y. |

[54] METHOD AND APPARATUS FOR MEASURING STEAM PROPERTIES
10 Claims, 2 Drawing Figs.

[52] U.S. Cl. .................................................. 73/190 R, 73/29, 73/192
[51] Int. Cl. ................................................... G01k 17/00
[50] Field of Search .......................................... 73/29, 192, 190

[56] References Cited
UNITED STATES PATENTS

| 1,742,203 | 1/1930 | Ellison.......................... | 73/192 |
| 3,430,483 | 3/1969 | Ilawson et al. ................. | 73/29 |

FOREIGN PATENTS

| 917,714 | 2/1963 | Great Britain................ | 73/192 |

Primary Examiner—James J. Gill
Assistant Examiner—Herbert Goldstein
Attorneys—K. E. Kavanagh and Thomas H. Whaley ABSTRACT: A method of and apparatus for determining the properties of steam by measuring the temperature thereof, adiabatically expanding a sample of the steam, separating the liquid from the expanded sample of steam, and comparing the chloride ion concentration of the separated liquid to that of the feed water used to generate the steam.

METHOD AND APPARATUS FOR MEASURING STEAM PROPERTIES

This is a division of Ser. No. 686,931, filed Nov. 30, 1967.

BACKGROUND OF THE INVENTION

This invention relates to an improved method of and apparatus for determining the quality of steam supplied by a steam generating apparatus. More particularly, the invention pertains to one wherein the liquid and vapor phases of an adiabatically expanded sample of wet steam are separated, with the properties of the separated liquid phase being compared to that of the feedwater in order to determine the quality and enthalpy of the produced steam.

Among the more important properties that should be monitored and controlled during the generation and use of steam are the quality and enthalpy thereof. One of the common methods for measuring such properties includes the use of a throttling calorimeter. Such a device is simple in operation. However, its applicability is limited to the range of steam qualities generally in excess of 90 percent. This limitation is due to the fact that the quality of the steam under test must be sufficiently high so that in throttling the steam expands into the superheat region. Such a device is ineffective, therefore, for measuring the quality of steam with a high liquid content as commonly encountered in oil recovery operation.

A method employing an orifice meter is sometimes used for measuring the quality of steam having a moisture content beyond the useful flange of the throttling calorimeter. The orifice meter apparatus incorporates a calibrated round aperture through which steam flows at a given rate and on each side of which the pressure is measured. An empirical determination of the steam quality is made on the basis of the flow characteristics of the calibrated orifice and the measured pressures. Such a method is simple in operation and inexpensive. However, the steam quality measurements rendered therefrom are erratic and unreliable, especially when dealing with a low quality steam or a variable steam flow rate.

Another of the methods for measuring the quality of wet steam beyond the range of the throttling calorimeter involves the usage of a separating calorimeter. In this method, the wet steam passes through the apparatus wherein the liquid droplets are physically separated from the vapor phase and collected. The amount of liquid thus separated over a given period of time and knowledge of the corresponding total steam flow permit computation of the steam quality. This method can be relatively accurate providing the liquid droplet collection is complete and thermodynamic processes that occur in the separator are well known and under control. In general, the steam undergoes a pressure drop in passing through the separator. This pressure drop and undetermined hear losses from the apparatus are detrimental to the accuracy of the measurements made. It is noted also that such a method requires that the entire quantity of steam produced be passed through the separating calorimeter, thereby requiring a complete diversion of the steam from its ultimate use. Since all the steam produced must be passed through the apparatus and elaborate measuring techniques must be used to determined the quality of the steam, such an apparatus does not readily lend itself to periodic quality determinations or field adaptation.

SUMMARY OF THE INVENTION

The invention provides a means for separating and collecting the liquid phase from an adiabatically expanded sample of the wet steam under test and subsequently comparing the chloride ion concentration of the separated liquid phase to that of the feed water used to generate the steam under test, in order to determine the quality and enthalpy thereof.

The principal advantage made possible by the use of this invention over methods used in the prior art is that the invention herein disclosed provides a simple and accurate means for determining the quality and enthalpy of steam and does not require the the total diversion of the steam to a separate apparatus in order to separate the liquid phase therefrom. With the method of this invention, a sample of the generated steam is analyzed, while the remaining flow of steam is uninterrupted and directd toward its intended use.

Accordingly, the objects of this invention include the provision of an accurate and reliable method and apparatus to measure the quality and enthalpy of steam without necessitating a total separation of the liquid and vapor phase thereof.

Another object of this invention is to provide a simple apparatus for separating a sample of the liquid phase of the generated steam from the vapor phase thereof.

These and other objects, advantages and features of the invention will become more apparent from the following description taken in conjunction with the accompanying drawing.

DESCRIPTION OF THE PREFERRED EMBODIMENT

Figure 1:
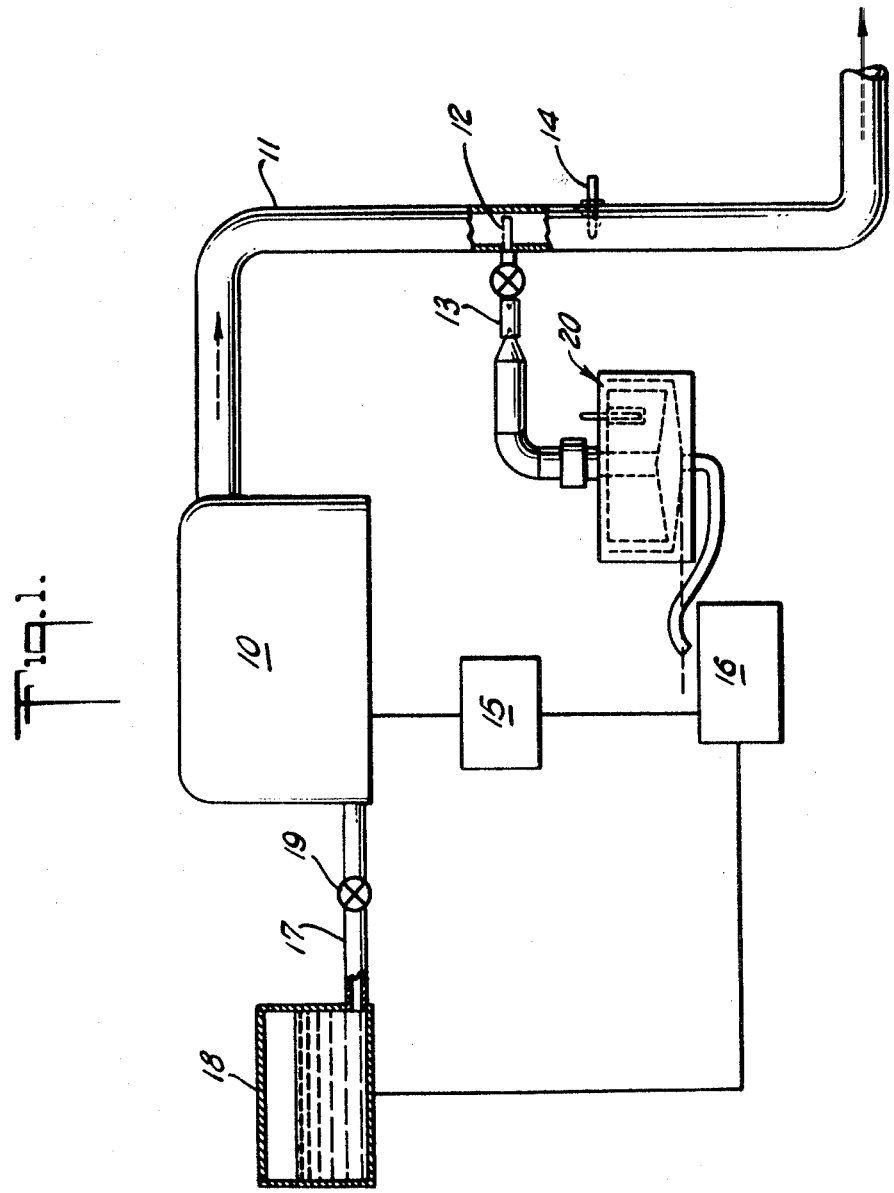
FIG. 1 represents a schematic view of the steam quality measuring apparatus in conjunction with a steam generator.

Generally, during a steam generating process, the primary consideration is to produce steam containing the greatest amount of heat therein and with a sufficient liquid content to prohibit deposits of salts in the steam generator thereby increasing the service life of the steam generating apparatus. The quality of the produced steam is a measure of the liquid content therein while the enthalpy is a measure of the amount of heat contained therein. The quality of the steam produced is also a primary indicator of the efficiency of the steam generator. To illustrate, when steam is used during a secondary recovery process, wherein steam is injected into a hydrocarbon bearing formation, the effectiveness of the steam flood is determined by the amount of heat imparted by the steam to the hydrocarbons in the formation. Such a determination of the heat imparted to the underground formation is made by measuring the enthalpy of the steam injected into the formation. Further, during the steam injection process, it is desired also to maintain and increase the service life of the steam generating apparatus. This may be accomplished by producing a low grade steam containing a sufficient liquid phase to carry any foreign matter or additives that were injected into the steam generator feed water.

Feed water supplied to the steam generator has a chloride ion concentration, and hence electrical conductivity, that remains essentially constant over long periods of time. Since during the production of wet steam a fraction of the processed feed water remains liquid in the form of droplets carried with the generated steam and since these liquid droplets carry the salts and ions originally present in the feed water, the increase of ion concentration in the liquid droplets becomes a measure of the quality of the generated steam. The steam quality $X_S$, or degree of dryness, is defined as the mass fraction of dry saturated steam generated of the total mixture and becomes, in terms of ion concentration, $$X_S = 1 - \frac{C_F}{C_S} \qquad (1)$$

wherein $C_F$ and $C_S$ represent the chloride ion concentration in the feed water and in the liquid phase of the generated steam, respectively. Alternatively, $C_F$ and $C_S$ may represent the conductivity of the feed water and the liquid phase of the generated steam, respectively.

When utilizing the chloride ion concentration test, the sodium chloride, in a neutral or weakly alkaline solution containing chromate, is titrated with silver nitrate. Silver chloride precipitates and at the end point red silver chromate is formed. The amount of silver chloride precipitate is then determined and becomes a measure of the sodium chloride present in the sample. Using this method, the sodium chloride concentration may be readily determined for both the feed water and the liquid droplets separated from the generated steam. It should also be noted that, a measurement of the conductivity of the feed water and a sample of liquid separated from the wet steam would provide an alternative method for determining steam quality.

In order to separate a sample of the liquid in the wet steam for the above quality determination tests, a representative sample of steam mixture is withdrawn from the steam line and expanded at constant enthalpy. Referring to FIG. 1, a sample of steam produced by the steam generating apparatus 10 is extracted from the steam conduit 11 by means of a sampling nozzle indicated at 12. The sample of steam is then expanded through the throttling tube 13, comprising a tubular orifice, at a constant enthalpy. It is noted that an expansion valve may be substituted. After this adiabatic expansion process, the expanded sample is at a pressure slightly higher than ambient atmospheric. The expanded sample of steam is then passed through a liquid-vapor separator, indicated generally at 20, wherein the liquid phase of the wet steam is coalesced at saturation conditions and collected as a representative liquid sample of the wet steam under analysis. Means are provided at 14 for measuring the temperature of the steam flowing through the steam conduit 11. It should be noted that a pressure measuring means may be substituted at 14. In the event that the steam in conduit 11 is sufficiently dry so as to result in expansion of the steam into the superheat region, the filtering elements in the liquid-vapor separator 20 may be removed and the system used as an ordinary throttling calorimeter.

Figure 2:
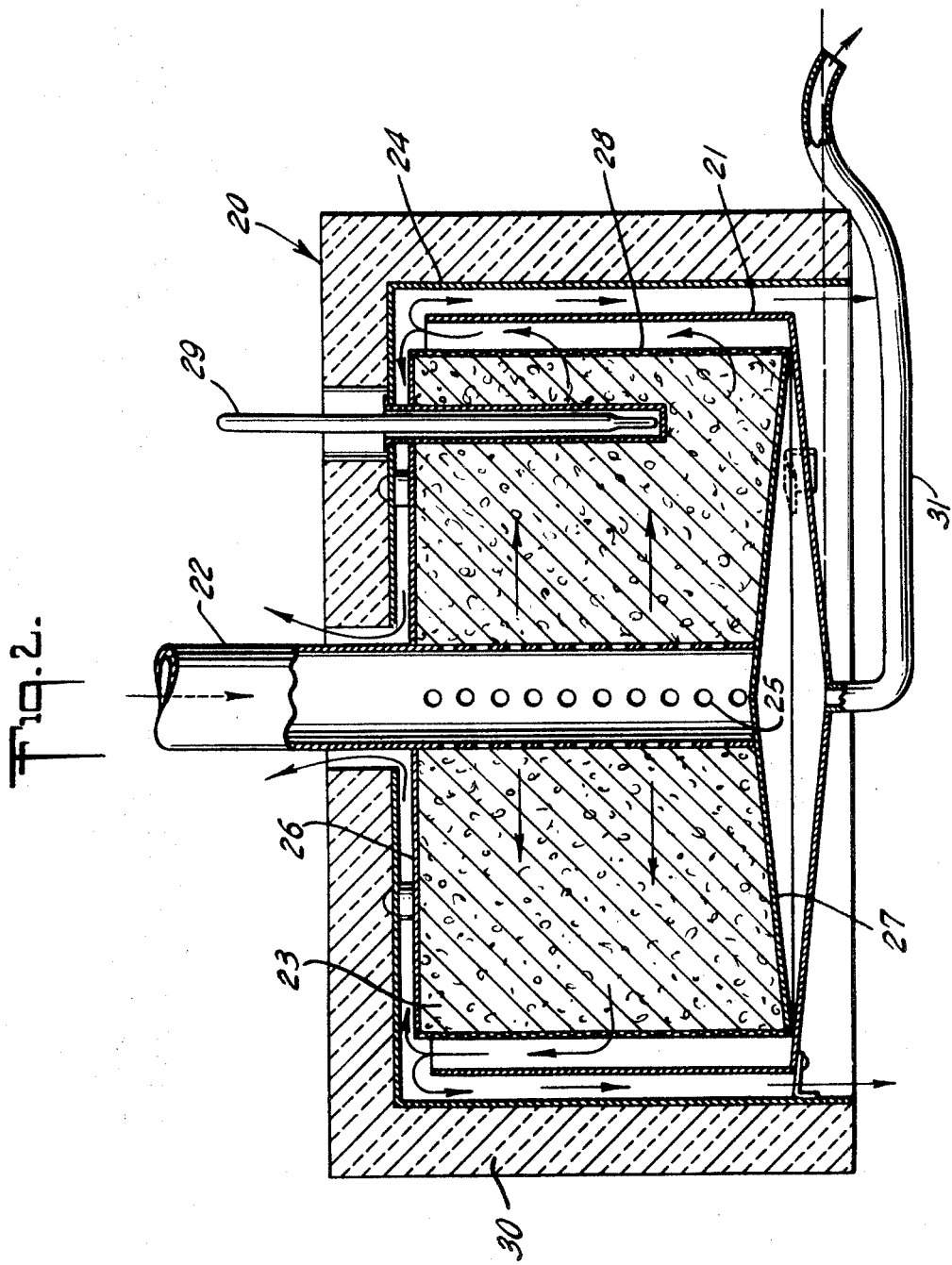
FIG. 2 is an elevation view of the liquid-vapor separator in cross section.

Referring to FIG. 2, the liquid-vapor separator 20 comprises a hollow cylindrical container 21 with an open top and with a tubular member 22 extending thereinto. Interposed in the annular space between the container 21 and the tubular member 22 is a coalescing means 23 which is spaced from the bottom and sides of the container 21. Preferably, the coalescing means comprises a large open-pore ester base polyurethan filtering element. Alternatively, it has been found that fiber glass provides a satisfactory material from which the coaslescing means 23 may be fabricated, as also would other pervious heat-resistant materials. To facilitate field usage of the equipment, the liquid-vapor separator is provided with a protective cover 24 which is attached to the cylindrical container 21 and the coalescing means 23. The expanded sample of wet steam is passed into the liquid-vapor separator 20 by means of the tubular member 22 positioned in the approximate center thereof. That part of the tubular member 22, which extends into the coaslescing member 23 contains along the periphery thereof a plurality of perforations, indicated at 25, wherein the total area of these perforations is equal to or greater than the cross-sectional area of the tubular member. Steam entering through the tubular member 22 exits through the perforations 25 contained therein and then passes through the coalescing means 23 mounted about the tubular member. The coalescing means 23 contains on the top and bottom thereof, impermeable members 26 and 27, for directing the flow of steam to exit through the sides thereof. The outer surface of the coalescing means 23 comprises a clothlike member 28 through which the exiting steam and coalesced liquid pass. A flow path for the exiting steam is provided by the annular spacing between the coalescing means 23 and the container 21, whereby the steam may exit through both the top passage between the outer cover 24 and the coalescing means 23, and through the passage between outer cover 24 and the sidewall of container 21. It should also be noted that this flow path provides insulation for the coalescing means of the apparatus. If it is desired to provide additional insulation, an insulating material, as indicated at 30, may be used on the top and sides of the cover 24. A temperature measuring means 29, which may be either a thermometer as shown, or a thermocouple, is placed within a well projecting into the coalescing means 23 and provides a means for measuring the temperature of the fluid passing therethrough.

The inwardly tapered bottom of the container 21 provides a drain for collecting the liquid separated from the steam. The liquid is directed toward the bottom of the container 21 since the bottom of the coalescing means 23 is outwardly tapered and thereby encourages the separated liquid to flow into the bottom of container 21. After a sufficient quantity of fluid has been separated from the wet steam, the fluid sample is collected in the bottom of container 21 and evacuated therefrom by means of the elongated discharge tube indicated at 31. A discharge tube 31 is attached to the center of the container bottom and is of a configuration wherein the outlet means thereof is positioned slightly higher than the lower most portion of the container bottom. This then provides a means for accumulating a sample of the liquid separated from the wet steam required for the quality tests previously discussed. It should also be noted that the discharge tube 31 could be provided with a valve or other means for control of the flow of the collected liquid.

The liquid sample separated by means of the liquid-vapor separator 20 is then tested and compared to that of the feed water used to generate the sample of wet steam thereby allowing a determination of the quality of the sample of the wet steam. The quality and enthalpy determined at the liquid-vapor separator 20 are directly related to steam line conditions by virtue of the throttling expansion process occurring adiabatically, i.e. the enthalpy is the same before and after the expansion process. This fact and knowledge of the temperature or pressure of the line wet steam permit calculation of the quality of the steam in the conduit 11.

Having determined the steam quality at the liquid-vapor separator, $X_S$, by the prior equation, the enthalpy at the separator, $h_s$, is determined by the relationship $$h_s = h_{fs} + X_S h_{fgs} \quad (2)$$

wherein $h_{fs}$ represents the enthalpy of the saturated liquid at the separator and $h_{fgs}$ represents the enthalpy of vaporization at the separator.

The saturated liquid enthalpy, $h_{fs}$, and the enthalpy of vaporization $h_{fgs}$, in the latter equation are found from standard steam tables for the prevailing saturation temperature and pressure at the liquid-vapor separator 20. The design of the liquid-vapor separator dictates that the prevailing pressure will be atmospheric whereas the temperature may be measured by means indicated at 29. As shown in FIG. 1, the steam is sampled by means of a sampling nozzle 12 and then passes through a tube 13 wherein it is throttled to a lower pressure. The kinetic energy of the high velocity steam is all returned as reheat in the fluid when it is brought to rest in the lower pressure liquid-vapor separator 20. The expansion is, therefore, at constant enthalpy. Since the expansion process occurs adiabatically, i.e., at constant enthalpy, the line steam enthalpy, $h_p$, is equal to the enthalpy at the liquid-vapor separator 20, $h_s$, obtained from the prior equation. Line steam quality, $X_P$, is then determined by the relation:

$$X_P = \frac{h_p h_{rp}}{h_{fgp}} \quad (3)$$

wherein $h_{fp}$ and $h_{fgp}$ are the saturated liquid enthalpy and the enthalpy of vaporization at steam line conditions respectively both found from the steamtables for the steam line temperature or pressure measured at 14.

To illustrate the method of this invention, the following example using numerical values is described. If the chloride ion concentration for the feed water used to generate the wet steam is 1500 p.p.m. and that for the collected liquid sample is 10,000 p.p.m., then the quality at the liquid-vapor separator 20 is calculated from equation (1) above as follows:

$$X_B = \left(1 - \frac{1,500}{10,000}\right)(100\%)$$
$$= 85\%$$

Assuming further, that the condition at the liquid-vapor separator are that of atmospheric pressure, 14.7 p.s.i.a., and at a temperature of 212° F. measured by the temperature measuring means 29, from equation (2) and the steam tables, the total enthalpy at the liquid vapor separator is calculated as follows:

$$h_s = 180.07 + 0.85 \,(970.3)$$
$$= 1004.83 \text{ B.t.u./lb.}$$

wherein this latter figure then represents the total enthalpy of the expanded sample of wet steam. Since the expansion process is adiabatic, the total enthalpy at the liquid-vapor separator equals the total enthalpy at the steam line condition. Therefore, if the temperature or pressure of the steam flowing in conduit 11 is known, the quality of the same may be determined. Assuming now that the steam line pressure is 250 p.s.i.a., then by equation (3)

$$X_P = \frac{1004.83 - 376.00}{825.10} (100\%)$$
$$= 76.2\%$$

where the quality determined as 76.2 percent refers to the quality of the wet steam flowing through the conduit 11.

Automatic means for regulating the quality of the steam produced by the steam generator 10 is provided by the control means 15 which is responsive to a signal from the quality measuring apparatus 16. The signal may be provided in a form proportionate to the desired quality minus the measured quality. The quality measuring apparatus 16 comprises a means to effect either the chloride ion concentration test or the conductivity test in conjunction with the method of the disclosure previously discussed and thereby provides a determination of the quality of the steam in conduit 11. Feed water is supplied to the steam generator 10 through a supply line 17 from the feed water tank indicated at 18. The rate of feed water supplied to the steam generator 10 is regulated by means of the valve 19 in accordance with the desired steam rate. In order to provide automatic regulation of the steam quality, control means 15, which is responsive to a signal from the quality measuring apparatus 16, regulates the heat input to the steam generator 10. This is best accomplished by regulating the air and fuel rates to the generator and thereby provides a means for controlling the quality of the steam produced by the steam generating apparatus 10.

Thus, there has been shown and described an improved method of and apparatus for determining the quality and enthalpy of wet steam which may be accomplished by periodic sampling without disturbing the ultimate use of the wet steam.

Other modifications and variations of the invention as hereinbefore set forth may be made without departing from the spirit and scope thereof, and therefore only such limitations should be imposed as are indicated in the appended claims.

We claim:

1. An apparatus for use in determining the enthalpy of generated wet steam comprising, in combination,
   a. means for taking a sample of said generated wet steam,
   b. means for expanding approximately adiabatically said sample of said wet steam,
   c. means for separating a portion of the liquid entrained in the expanded wet steam at approximately atmospheric pressure and at the approximate corresponding saturation temperature of said liquid, and
   d. means for measuring the quality of said expanded wet steam at said means for separating a portion of said liquid including means for measuring a physical characteristic of the separated liquid and the feed water used to generate said wet steam the enthalpy of said expanded wet steam being substantially equal to the enthalpy of said generated wet steam.

2. An apparatus as defined in claim 1, wherein said means for measuring the quality of said expanded wet steam comprises a means for measuring the chloride ion concentration of said liquid separated from said expanded wet steam and a means for measuring the chloride ion concentration of the feed water used to generate said wet steam.

3. An apparatus as defined in claim 1, wherein said means for measuring the quality of said expanded wet steam comprises a means for measuring the electrical conductivity of said liquid separated from said expanded wet steam, and a means for measuring the electrical conductivity of the feed water used to generate said wet steam.

4. An apparatus as defined in claim 1 which includes a means for measuring the pressure of said generated wet steam to provide a basis for determining the saturated liquid enthalpy and enthalpy of vaporization of said generated wet steam, from which the quality of said generated wet steam may be determined.

5. An apparatus as defined in claim 1 which includes a means for measuring the temperature of said generated wet steam to provide a basis for determining the saturated liquid enthalpy and enthalpy of vaporization of said generated wet steam, from which the quality of said generated wet steam may be determined.

6. A method for use in determining the enthalpy of generated wet steam which comprises,
   a. expanding adiabatically a sample of said generated wet steam,
   b. separating the liquid entrained in said sample of expanded wet steam at approximately saturation conditions, and
   c. measuring the quality of said sample of expanded wet steam by measuring a physical characteristic of the separated liquid and the feed water used to generate said steam, the enthalpy of said expanded wet steam at the separating condition being approximately equal to the enthalpy of said generated wet steam.

7. A method as defined in claim 6, wherein said measuring the quality of said sample of expanded wet steam comprises measuring the electrical conductivity of said liquid separated from said expanded wet steam, and measuring the electrical conductivity of the feed water used to generate said wet steam.

8. A method as defined in claim 7, wherein said measuring the quality of said sample of expanded wet steam comprises measuring the chloride ion concentration in said liquid separated from said expanded wet steam, and measuring the chloride ion concentration in the feed water used to generate said wet steam, said chloride ion concentration being determined by titrating the chloride ions with silver nitrate.

9. The method of claim 6 which includes the additional step of measuring the pressure of the generated wet steam, to provide a basis for determining the saturated liquid enthalpy and the enthalpy of vaporization of said generated wet steam from which the quality of said generated wet steam may be determined.

10. The method of claim 6 which includes the additional step of measuring the temperature of the generated wet steam, to provide a basis for determining the saturated liquid enthalpy and the enthalpy of vaporization of said generated wet steam from which the quality of said generated wet steam may be determined.